(12) United States Patent
Nakamori et al.

(10) Patent No.: US 6,300,710 B1
(45) Date of Patent: Oct. 9, 2001

(54) FILAMENT LAMP FOR EMISSION OF YELLOW LIGHT

(75) Inventors: Katsumi Nakamori, Himeji; Shigeki Fujisawa, Takasago; Yoshihiko Okumura, Himeji; Hiroshi Minamizono, Okayama, all of (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,149

(22) Filed: Nov. 18, 1999

(30) Foreign Application Priority Data

Nov. 18, 1998 (JP) .................................................. 10-328049

(51) Int. Cl.⁷ ...................................................... H01K 1/32
(52) U.S. Cl. ........................... 313/112; 313/315; 313/635
(58) Field of Search ..................................... 313/110, 112, 313/635, 489, 116, 315; 106/712, 436

(56) References Cited

U.S. PATENT DOCUMENTS

| | | |
|---|---|---|
| 4,633,127 | 12/1986 | Beurskens et al. . |
| 4,800,319 | 1/1989 | Van Kemenade et al. . |
| 5,177,395 * | 1/1993 | Reisman ................. 313/112 |
| 5,578,892 * | 11/1996 | Whitman et al. ............. 313/112 |

FOREIGN PATENT DOCUMENTS

| | | | |
|---|---|---|---|
| 2 183 363 | 6/1987 | (GB) ................. G02B/5/26 |
| 6-92623 | 4/1994 | (JP) ................. C01B/33/20 |

OTHER PUBLICATIONS

J. Hackman, Nickel Antimony Titanate Yellow, Pigment Handbook 2nd ed. vol. 1, p375, Wiley & Sons, 1988.*

J. Hackman, Synthetic Inorganic Complexes, Pigment Handbood 1st ed, vol. 1, p419, 1973.*

Engelhard, Material Safty Data Sheet, Meteor Bright Yellow 8320, cira Nov. 1989.*

* cited by examiner

*Primary Examiner*—Michael H. Day
(74) *Attorney, Agent, or Firm*—Nixon Peabody LLP; David S. Safran

(57) ABSTRACT

A filament lamp for an emission of yellow light, with a color film which is formed on the surface of the bulb, where the color film is essentially composed of a combined oxide of titanium, nickel and antimony. The color film may have a ratio of titanium, nickel and antimony to one another in a weight ratio of 5.6 to 8.6:3.6 to 6.6:1.0 to 1.8. Also, the color film may be a sintered coating formed by admixing a solution A produced by dissolving a nickel salt and an antimony salt in an organic solvent, addition of a titanium alkoxide and reaction of the reaction mixture; and addition of a stabilizer which forms a chelate with titanium with a solution B produced in substantially the same manner as solution A. The solutions A and B contain nickel nitrate-6-hydrate, antimony trioxide, tetraisopropoxy titanium, acetyl acetone, and/or water.

13 Claims, 1 Drawing Sheet

FILAMENT LAMP FOR EMISSION OF YELLOW LIGHT

BACKGROUND OF THE INVENTION

1. Field of the Invention

The invention relates to a filament lamp for emission of yellow light. The invention relates especially to a filament lamp for emission of yellow light which is advantageously used for a head lamp or a fog lamp of a motor vehicle.

2. Description of Related Art

For example, a lamp which emits yellow light is used as the head lamp or fog lamp for a motor vehicle so that the driver acquires a suitable visual field even in thick fog or rain. In one such lamp, the standard range of chromaticity of the emitted yellow light is established by "ECE Regulation No. 37."

Conventionally, as the lamp for emitting yellow light which is used for a motor vehicle head lamp a lamp is known which comprises:

- a filament lamp with a colorless, transparent bulb;
- a concave reflector which surrounds this filament lamp; and
- a front glass which is located in an opening of this concave reflector, and in which the front glass is colored yellow by a cadmium-based dye.

However, since a heavy metal, such as cadmium or the like, has adverse effects on the human body, with respect to the environment, it is desirable not to use a material which contains a heavy metal, such as cadmium or the like, in a lamp for a motor vehicle.

As the means for producing a lamp which emits yellow light, providing the outside surface of the lamp bulb with a yellow colored film is known. A composition for producing a yellow colored film is known (published Japanese Patent Application HEI 6-92623). This composition is produced by a solution of an alkyl silicate, such as tetraethoxysilane or the like containing vanadium pentoxide powder with a grain size of less than or equal to 0.2 microns, finely distributed.

However, since a color film which is obtained by this composition does not satisfy the chromaticity range established by "ECE Regulation No. 37" or has a low light beam transmission factor, it is not suited for a color film for a lamp. Furthermore, when a dispersion mixing device, such as a ball mill or the like, is used to distribute the vanadium pentoxide powder, there is the danger that changes in the shade of the color film occur, and a reduction in the light beam transmission factor will arise, as a result of the fact that, when producing the composition, a powder is mixed in originating from the grinding medium and the inside wall of the device which has been formed by abrasion.

Furthermore, a filament lamp for emitting yellow light a lamp is known in which the outer surface of the bulb is provided with a multilayer film in which layers with a low index of refraction, such as silicon dioxide or the like, and layers with a high index of refraction, such a titanium dioxide or the like, are alternately placed on top of one another.

In one such multilayer film, light interference is used. Since it has the property that light is transmitted in a certain wavelength range, and at the same time, also has the property that light is reflected in a certain wavelength range, there is the disadvantage that, depending on the variation of the layer thickness and the radiation angle of the light, light besides yellow light is emitted.

SUMMARY OF THE INVENTION

The invention was devised to eliminate the above described disadvantages of the prior art. Therefore, a first object of the present invention is to devise a filament lamp for emission of yellow light in which yellow light can be emitted without a material being used which contains heavy metals which exert adverse effects on the environment, such as cadmium, lead and the like.

A second object of the invention is to devise a filament lamp for emitting yellow light which has a color film which can be easily produced, which has high transparency and high heat resistance, and in which the desired yellow light can be emitted without a material being used which contains heavy metals which have adverse effects on the environment, such as cadmium, lead and the like.

Theses objects achieved in accordance with the invention by a filament lamp for emitting yellow light which comprises:

- a glass bulb,
- a filament which is located in the bulb; and
- a color film which is formed on the outer surface and/or the inner surface of the bulb, and is produced from a combined oxide of titanium, nickel and antimony.

The objects of the invention are also advantageously achieved by a filament lamp for emitting yellow light in which the above described color film has a weight ratio of titanium, nickel and antimony to one another of 5.6 to 8.6:3.6 to 6.6:1.0 to 1.8.

The objects are furthermore advantageously achieved according to the invention by the above described color film being produced by sintering of a coating liquid which is obtained by mixing the solution A described below with the solution B described below:

(Solution A)

Titanium alkoxide is added to a solution which is produced by dissolving nickel salt in an organic solvent and by dissolving antimony salt in the organic solvent and is reacted. A stabilizer which composed of a compound which can form a chelate with titanium is added to this solution. In this way solution A is produced.

(Solution B)

Water and then titanium alkoxide are added to a solution which is produced by dissolving nickel salt in an organic solvent and by dissolving antimony salt in the organic solvent and is reacted. Afterwards, a stabilizer which composed of a compound which can form a chelate with titanium is added. In this way, solution B is produced.

Basically, suitable organic solvents are all those in which the components used dissolve adequately and which do not lead to unwanted reactions with the reaction participants. Monovalent alcohols, glycolic ethers or acetic acid esters which can be used also in mixtures among one another are especially suitable.

The stabilizer is a compound which can form a chelate with titanium. Preferably, those stabilizers which lead to formation of chelate rings are preferred. It is preferred when the stabilizer is added to the titanium in a roughly stoichiometric amount so that it is ensured that both the titanium and also the stabilizer react essentially completely with one another.

Especially preferred stabilizers are β-diketones or β-keto acids. This bivalent stabilizers are feasibly added to the titanium in a molar ratio of roughly 2:1, therefore, in the aforementioned stoichiometric ratio which ensures essentially complete reaction of the two components.

Neither are the salts used especially limited. Suitably, those salts are used which dissolve in the solvent used to a sufficient degree. For example, nickel nitrate, tetraisopropoxy titanium, antimony trioxide, or tetrabutoxy titanium are suitable.

An especially preferred dye solution for sintering is obtained when the solutions A and B are mixed with one another with the weight percentages of 7 to 13 percent by weight nickel nitrate-6-hydrate, 0.6 to 1.2 percent by weight antimony trioxide, 10 to 15 percent by weight tetraisopropoxy titanium and 7 to 12 percent by weight acetyl acetone. Moreover, solution B contains 0.3 to 1.5 percent by weight water. In the coating solution in accordance with the invention, these solutions A and B are advantageously mixed with one another in a weight ratio to one another of 90:10 to 30:70.

In the following, the invention is further described using several embodiments described in the drawings.

DETAILED DESCRIPTION OF THE INVENTION

Figure 1:
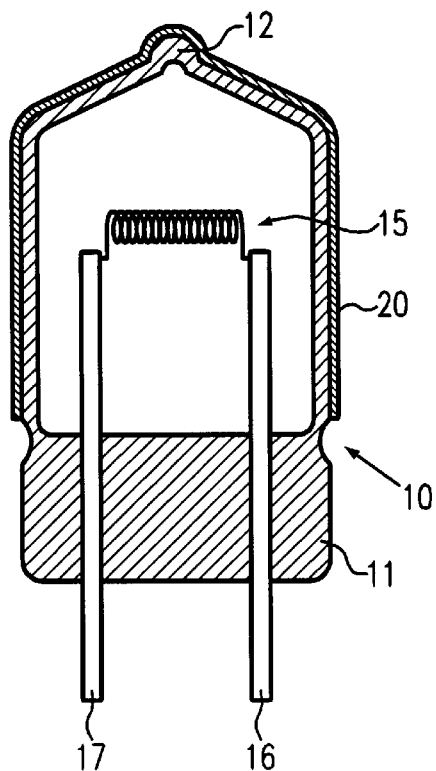
FIG. 1 is a schematic cross section of the arrangement of one example of a filament lamp in accordance with the invention for emitting yellow light.

FIG. 1 is a schematic cross section of the arrangement of an embodiment of a filament lamp in accordance with the invention for emitting yellow light which has an bulb 10 made of hard glass, one end of which is provided with a hermetically sealed portion 11 and the other end being provided with the remainder 12 of an outlet tube. In this bulb 10, there is a coil-shaped filament 15 extending in a direction which orthogonally intersects its longitudinal center line. Lead pins 16, 17 are connected to the two ends of this filament 15, hermetically penetrate the hermetically sealed portion 11 of the bulb 10 and extend away from it. The outer surface of the bulb 10 is provided with a color film 20 which transmits the yellow light portion of the light emitted by the filament 15.

It is preferred that this color film have a thickness of 2 to 3.5 microns. At a thickness of the color film 20 of less than 2 microns, there are cases in which it is difficult to obtain the desired yellow light. On the other hand, in the case in which the thickness of the color film 20 is greater than 3.5 microns, there are cases in which high transparency cannot be obtained.

The color film 20 is essentially composed of a combined oxide of titanium, nickel and antimony. It is desired that the ratio of titanium, nickel and antimony to one another in the color film 20 is a weight ratio of 5.6 to 8.6:3.6 to 6.6:1.0 to 1.8. In this way, a filament lamp which emits yellow light is reliably obtained.

It is preferred that such a color film 20 be obtained by applying and sintering onto the bulb 10 a coating liquid which is obtained by mixing the solution A described below and the solution B described below:

(Solution A)

Titanium alkoxide is added to a solution which is produced by dissolving nickel salt and antimony salt in an organic solvent and is reacted. In this way, a polymer solution is produced which contains a polymer of titanium, nickel and antimony. A stabilizer which composed of a compound which can form a chelate with titanium is added to this solution. In this way, the solution A which is contained in the coating liquid is produced.

The class of monovalent alcohols, the acetic acid ester class, the glycolic ether class and the like can be advantageously used as the organic solvent for producing solution A. Specific examples of the class of monovalent alcohols can be methanol, ethanol, propanol, butanol and the like. Specific examples of the acetic acid class can include ethyl acetate, butyl acetate and the like. Specific examples of the glycolic ether class can include propylene glycol dimethyl ether, propylene glycol ethyl ether and the like.

These compounds are suitably selected with consideration of the following, individually or at least two types combined with one another, and are used as the organic solvent to produce solution A:

the solubility of the nickel salt used and the antimony salt used;

moisture content;

vaporization property during sintering;

material of the bulb used; and type of device for applying the coating liquid.

Furthermore, it is desirable to use an organic solvent with an inherently low water content so that no adverse effect is exerted on the reaction of the titanium alkoxide. An organic solvent can also be advantageously used which has been refined by distillation and thus dewatered or which has been dewatered in some other way.

One preferred ratio of use of the organic solvent in solution A is a percentage by weight from 65 to 75%. In the case of a percentage by weight of less than 65% a viscous coating liquid is obtained by which there are cases in which control of the layer thickness becomes difficult when this coating liquid is applied. In the case of a percentage by weight of greater than 75% in the coating liquid obtained, the component for formation of the color film 20 is overly diluted. To form a color film 20 with the expected thickness this coating liquid must be applied more often. As a result, when the color film 20 is formed, the working efficiency is reduced.

The nickel salt can be, for example, nickel-(II)-nitrate-6-hydrate, nickel-(II)-chloride-6-hydrate and the like. Antimony trioxide and the like can be used as the antimony salt. Titanium isopropoxide, titanium butoxide and the like can be used as titanium alkoxide.

The stabilizer is used to form a chelate with titanium, especially a chelate ring, in this way to suppress polymerization of nickel and antimony and to impart suitable viscosity to the coating liquid to be obtained. One such stabilizer is not especially limited, to the extent it can form a chelate with titanium. For example, a compound of the β-diketone class such as acetyl acetone, benzoyl acetone and the like, and the class of β-keto acids, such as acetic acid ester, propionyl butyric acid and the like can be advantageously used.

In the production of solution A, the ratio of use of nickel nitrate-6-hydrate as the nickel salt, antimony trioxide as the antimony salt, tetraisopropoxy titanium as the titanium alkoxide and acetyl acetone as the stabilizer to one another is preferably a ratio by weight from 7 to 13:0.6 to 1.2:10 to 15:7 to 12, and more preferably, a ratio by weight of 8 to 11:0.8 to 1.1:11 to 13:8 to 11.

In the case of an overly small ratio of use of the nickel salt, the color film obtained often has too little a yellow shade and low tinctorial power. In the case of an overly large ratio of use of nickel salt, the color film obtained often has cloudiness and low transparency. Furthermore, cracks often arise in this color film and the heat resistance decreases.

In the case of an overly small ratio of use of the antimony salt, the color film obtained often has low tinctorial power. Furthermore, cracks often arise in this color film, resulting in the film being easily lost. In the case of an overly large ratio of use of antimony salt in the color film obtained, cloudiness arises and its transparency is often low.

In the case of an overly small ratio of use of titanium alkoxide, salt is left over which has not reacted with titanium alkoxide because the relative ratio to nickel salt and antimony salt is too low. As a result, cloudiness often appears in the color film obtained, and its transparency is often low. In the case of an overly large ratio of use of titanium alkoxide, the color film obtained often has low tinctorial power and in this film cracks often occur.

In the case of an overly small ratio of use of the stabilizer, the polymerization of titanium, nickel and antimony progresses to an excessive degree. Therefore, cloudiness occurs in the resulting color film, and its transparency is often low as a result. When polymerization of titanium, nickel and antimony continues further, a sediment is formed prematurely in the solution, for which reason, an advantageous storage stability cannot be obtained. In the case of an overly large ratio of use of the stabilizer during sintering, formation of the color film takes a long time. As a result, in the formation of the color film, high time efficiency is not obtained.

(Solution B)

Water and then titanium oxide are added to a solution which is produced by dissolving nickel salt and antimony salt in an organic solvent and the mixture is reacted. In this way, a polymer solution is produced which contains a polymer of titanium, nickel and antimony. A stabilizer which is composed of a compound which can form a chelate with titanium is added to this solution. In this way, solution B is produced which is contained in the coating liquid.

Specific examples of the organic solvent, the nickel salt, the titanium compound, and the antimony salt for producing the solution B can be the above described examples of the compounds which are used to produce solution A. The same substances as in solution A or also different substances can also be used. But, it is desirable to use the same substances as in solution A.

In the production of solution B, the preferred ratio of use of nickel nitrate-6-hydrate as the nickel salt, antimony trioxide as the antimony salt, water, tetraisopropoxy titanium as the titanium alkoxide and acetyl acetone as the stabilizer to one another is a ratio by weight from 7 to 13:0.6 to 1.2:10 to 15:7 to 12, more preferably, a ratio by weight of 8 to 11:0.8 to 1.1:0.4 to 1.0:11 to 13:8 to 11.

In the case of an overly small or overly large ratio of use of nickel salt, antimony salt, titanium alkoxide and the stabilizer the same problems occur as in solution A.

In the case of an overly small ratio of use of water, in the resulting color film cloudiness often occurs, which causes the transparency of the film to become low. In the case of an overly large ratio of use of water the polymerization of titanium, nickel and antimony continues to an excess degree. As a result a sediment is formed prematurely in the solution, by which cases arise in which an advantageous storage stability cannot be obtained.

In this solution B water is added before adding the titanium alkoxide and the reaction with it. In this way the degree of polymerization of the polymer to be obtained becomes higher than the degree of polymerization of the polymer in solution A.

(Coating liquid)

The coating liquid for obtaining a color film is produced by mixing the above described solution A with the above described solution B. By this intermixing of solutions A and B which contain polymers with different degrees of polymerization, a coating liquid with advantageous layer-formation properties is obtained. At the same time, there are the advantages that cracks hardly ever occur and a color film with high transparency and high thermal resistance can be obtained.

It is desirable for the mixing ratio of solution A to solution B to be a ratio by weight of from 90:10 to 30:70, especially 80:20 to 40:60.

In the case of using a coating liquid with an overly small ratio of solution A or in the case of using a coating liquid only from solution A, cloudiness often occurs in the resulting color film, which causes the transparency of the film to become low. In the case of using a coating liquid with an overly small ratio of solution B or in the case of using a coating liquid only from solution B, cracks and cloudiness often arise in the resulting color film, by which the transparency of the film becomes low.

(Formation of the color film)

The color film can be formed by the above described coating liquid being applied to the bulb, dried, and thus, an application film being formed. This application film is then sintered. However, it is preferred that the application of the coating liquid, drying and sintering of the application film be repeated, for example, 10 to 15 times, and in this way, a color film with the desired thickness formed.

A process for application of the coating liquid is not especially limited. However, a dipping process can be used to advantage. In the case of using a dipping application method, the absorption rate is, for example, 10 mm/sec.

The preferred temperature for sintering of the film formed by application of the coating liquid is at least 600° C. In the case of a sintering temperature of less than 600° C., the thermal decomposition reaction of the salts and the removal of the organic components become insufficient, by which a color film 20 with adequate transparency can only be obtained with difficulty.

In a filament lamp for emitting yellow light with the above described arrangement, the color film 20 of a combined oxide of titanium, nickel and antimony is formed on the outside surface of the bulb 10. The lamp can therefore emit yellow light without a material being used which contains heavy metal which have adverse effects on the environment, such as cadmium, lead and the like.

Since the color film 20 is produced by sintering a coating liquid with the indicated composition, it has high transparency and high thermal resistance. This prevents cracks from forming and formation of the color film 20 is therefore facilitated. Furthermore, by forming such a color film 20, the desired yellow light can be emitted which has the chromaticity range established, for example, by "ECE Regulation No. 37." The above described filament lamp for emitting yellow light is therefore suited for a head lamp and a fog lamp for a motor vehicle.

The filament lamp in accordance with the invention for emission of yellow light is not limited to the above described embodiments, but different changes can be made.

The color film can be formed, for example, on the inner surface of the bulb or both on the outer surface and also on the inner surface of the bulb.

Also, the specific arrangement of the filament lamp, aside from the color film, can be suitably varied.

EMBODIMENTS

In the following, one specific embodiment of a filament lamp in accordance with the invention for emission of yellow light is described. The invention is, however, not limited to this. In the embodiments described below the following materials were used as the materials of the coating agent:

(organic solvents)
ethyl alcohol (high-purity, produced by "Kanto Kagaku")
ethyl acetate (high-purity, produced by "Kanto Kagaku")
(nickel salt)
nickel nitrate-6-hydrate (high-purity, produced by "Kanto Kagaku")
(antimony salt)
antimony trioxide (high-purity, produced by "Kanto Kagaku")
(titanium alkoxide)
tetraisopropoxy titanium (produced by "Nihon Soutatsu")
(stabilizer)
acetyl acetone (produced by "Dial Kagaku")

Embodiment 1

According to the arrangement shown in FIG. 1 a filament lamp with a rated output of 13.2 V and a power consumption of 55 W was produced in which color film is not formed. The chromaticity of the light emitted from this filament lamp has X-coordinates of 0.426 and Y-coordinates of 0.400.

A glass vessel was filled with a mixed organic solvent of ethanol and ethyl acetate (mixing ratio 50:50) with a percentage by weight of 69. Nickel nitrate-6-hydrate with a percentage by weight of 10 was added to this mixed organic solvent and stirred with a magnetic stirrer until the nickel nitrate was completely dissolved. Furthermore, antimony trioxide with a percentage by weight of 1 was added to this solution and stirred until the antimony oxide was completely dissolved. Afterwards titanium tetraisopropoxide with a percentage by weight of 12 was added to the resulting solution and reacted. The reaction mixture was then allowed to stand until the heat evolution by the reaction had decayed and the temperature of the reaction liquid had dropped to room temperature. Afterwards the reaction liquid acetyl acetone with a percentage by weight of 8 was added and stirred for roughly 17 hours. In this way, solution A was produced.

Furthermore solution B was produced in the same way as in solution A, except that, before adding the titanium tetraisopropoxide, distilled water with a percentage by weight of 0.5 was added. By mixing the solutions A and B produced in this way with a percentage by weight of 60:40, the coating liquid was produced.

The coating liquid produced in the above described manner was applied by the dipping application process to the outer surface of the bulb under the condition of an absorption rate of 10 mm/sec. In this way, an application film was formed on the outside surface of the bulb. Then, the application film which was formed was dried for 5 seconds and afterwards sintered in an electric furnace at 600° C. for 2 minutes. The filament lamp was removed from the electric furnace and subjected to three minutes of air cooling. The above described actions were repeated a total of 13 times. In this way, on the outside surface of the bulb, a color film with a thickness of roughly 2.5 microns was formed. In this color film, the ratio of titanium, nickel and antimony to one another was measured. The ratio by weight of titanium, nickel and antimony to one another was roughly 5:4:1.

A filament lamp for emission of yellow light in accordance with the invention was produced and operated in the above described manner. In doing so, it was confirmed that yellow light is emitted.

Figure 2:
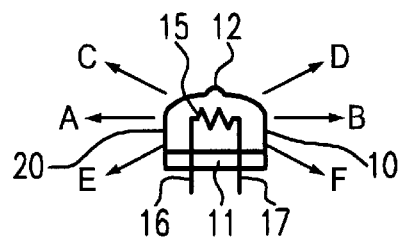
FIG. 2 schematically depicts the angle of the radiant light in an embodiment in which the chromaticity was measured.

In the above described filament lamp for emission of yellow light, cracking in the color film, transparency and heat resistance of the color film were evaluated as follows. Furthermore, the chromaticity of the radiant light was measured. Table 1 below shows the results.
(Cracking in the color film)
The color film was visually observed. Thus, it was studied whether cracking occurred in the color film or not.
(Transparency of the color film)
The color film was visually observed. Thus, it was studied whether cloudiness occurred or not in the cylindrical part of the bulb. A case in which no cloudiness was detected was labeled o, while a case in which cloudiness was detected was labeled x. Evaluation was performed in this way.
(Heat resistance of the color film)
After three hundred hours of uninterrupted operation of the filament lamp, the color film was visually observed. Thus, it was studied whether cracking in the color film occurred or not. The temperature of the bulb during operation of the filament lamp was 460 to 500° C.
(Measurement of chromaticity)
As is shown in FIG. 2, the chromaticity of the light which was emitted in a total of 6 directions was measured, specifically in two directions (along arrows A and B) which are horizontal around the position of the filament 15 in the filament lamp, and four directions (along arrows C, D, E, F) which have a slope of 30° to the top and bottom with respect to the horizontal direction. The average value was determined therefrom.

In the following, the conditions of chromaticity of the yellow light which are established by "ECE Regulation No. 37" are described:

$y \leq 1.29x - 0.100$ $y \geq -x + 0.940$ $y \leq -x + 0.966$ $y \geq 0.440$ $y \geq 0.138 + 0.580x$ (Formula 1)

Embodiment 2

A glass vessel was filled with a mixed organic solvent of ethanol and ethyl acetate (mixing ratio 60:40) with a percentage by weight of 70. Nickel nitrate-6-hydrate with a percentage by weight of 8 was added to this mixed organic solvent and stirred with a magnetic stirrer until the nickel nitrate was completely dissolved. Furthermore, antimony trioxide with a percentage by weight of 0.8 was added to this solution and stirred until the antimony trioxide was completely dissolved. Afterwards titanium tetraisopropoxide with a percentage by weight of 12 was added to the resulting solution and reacted. This reaction mixture was then allowed to stand until the heat evolution by the reaction had decayed and the temperature of the reaction liquid had dropped to room temperature. Afterwards, the reaction liquid acetyl acetone with a percentage by weight of 9 was added and stirred for roughly 17 hours. In this way, the solution A was produced.

Furthermore, solution B was produced in the same way as in solution A, except the fact that, before adding the titanium tetraisopropoxide, distilled water with a percentage by weight of 0.4 was added. By mixing the solutions A and B produced in this way with a ratio by weight of 50:50, the coating liquid was produced.

Besides formation of the color film with a thickness of roughly 2.5 microns using the above described coating agent, a filament lamp in accordance with the invention for emission of yellow light was produced in the same way as in embodiment 1. In the color film, the ratio of titanium, nickel and antimony to one another was measured. The ratio by weight of titanium, nickel and antimony to one another was roughly 6.6:4:1. During operation of this filament lamp for emission of yellow light, it was confirmed that yellow light is emitted.

In the above described filament lamp for emission of yellow light, cracking in the color film, transparency and heat resistance of the color film were evaluated in the same way as in embodiment 1. Furthermore, the chromaticity of the radiant light was measured. Table 1 shows the result.

Embodiment 3

In the production of the coating liquid in embodiment 2, the ratio of solution A to solution B was changed to a weight ratio of 80:20. Besides the production of the color film with a thickness of roughly 2.5 microns using this coating agent, a filament lamp in accordance with the invention for emission of yellow light was produced in the same way. In the color film, the ratio of titanium, nickel and antimony to one another was measured. The ratio by weight of titanium, nickel and antimony to one another was roughly 6.6:4:1. During operation of this filament lamp for emission of yellow light it was confirmed that yellow light is emitted.

In the above described filament lamp for emission of yellow light, cracking in the color film, transparency and heat resistance of the color film were evaluated in the same way as in embodiment 1. Furthermore, the chromaticity of the radiant light was measured. Table 1 shows the result.

TABLE 1

|  | Embod. 1 | Embod. 2 | Embod. 3 |
| --- | --- | --- | --- |
| Cracking in color film | none | none | none |
| Transparency of the sintered film | 0 | 0 | 0 |
| Cracking in color film after 300 hours of operation | none | none | none |
| Chromaticity |  |  |  |
| X-coord. | 0.5054 | 0.5025 | 0.4982 |
| Y-coord. | 0.4475 | 0.4462 | 0.4460 |

As follows from the result in Table 1, in the filament lamps for emission of yellow light, it was confirmed in embodiments 1 to 3 that no cracking occurred in the color film, and that, furthermore, the color films have high transparency and high heat resistance, because the color films were produced by sintering the described coating liquids.

Figure 3:
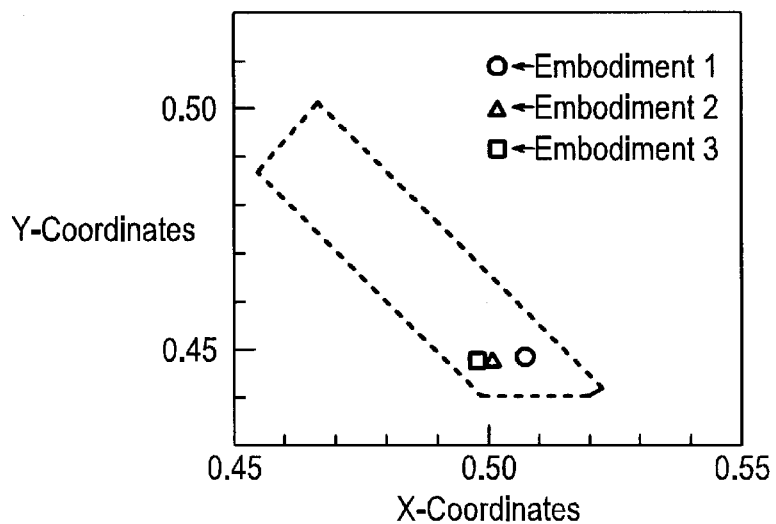
FIG. 3 is a graph representing color coordinates of the radiant light in filament lamps for emitting yellow light in the embodiments.

FIG. 3 is a color diagram which represents the color coordinates of the radiant light of the filament lamps for emission of yellow light in embodiments 1 to 3. In the figure, the area within the outline shown by the broken line is the region of chromaticity of yellow light established by "ECE Regulation No. 37." As is apparent from FIG. 3, for the filament lamps for emission of yellow light according to embodiments 1 to 3, it was confirmed that their radiant light is located within the region of chromaticity established by "ECE Regulation No. 37."

The chromaticity of the radiant light from 6 directions (A, B, C, D, E, F) in the respective filament lamp for emission of yellow light had extremely low variations.

Embodiment 4

A glass vessel was filled with a mixed organic solvent of ethanol and ethyl acetate (mixing ratio 50:50) with a percentage by weight of 70. Nickel nitrate-6-hydrate with a percentage by weight of 12 was added to this mixed organic solvent and stirred with a magnetic stirrer until the nickel nitrate was completely dissolved. Furthermore, antimony trioxide with a percentage by weight of 1 was added to this solution and stirred until the antimony oxide was completely dissolved. Afterwards, titanium tetraisopropoxide with a percentage by weight of 13 was added to the resulting solution and reacted.

Besides formation of the color film with a thickness of roughly 2.5 microns using the reaction liquid which was obtained as the coating liquid, a filament lamp according to the invention for emission of yellow light was produced in this same way as in embodiment 1. In the color film, the ratio of titanium, nickel and antimony to one another was measured. The ratio by weight of titanium, nickel and antimony to one another was roughly 6.6:4:1. During operation of this filament lamp for emission of yellow light it was confirmed that yellow light is emitted.

In the above described filament lamp for emission of yellow light the color film was visually observed. In doing so, it was confirmed that cracks formed. Furthermore cloudiness was present in the color film and its transparency was low.

Comparison Example 1

A glass vessel was filled with a mixed organic solvent of ethanol and ethyl acetate (mixing ratio 50:50) with a percentage by weight of 69. Nickel nitrate-6-hydrate with a percentage by weight of 10 was added to this mixed organic solvent and stirred with a magnetic stirrer until the nickel nitrate was completely dissolved. Afterwards, titanium tetraisopropoxide with a percentage by weight of 13 was added to the resulting solution and reacted. This reaction mixture was then allowed to stand until the heat evolution by the reaction had decayed and the temperature of the reaction liquid had dropped to room temperature. Afterwards, the reaction liquid acetyl acetone with a percentage by weight of 8 was added and stirred for roughly 17 hours.

The resulting solution was applied by the dipping application process to the outer surface of the bulb under the condition of an absorption rate of 10 mm/sec. In this way an application film was formed on the outside surface of the bulb. Then, the application film formed was air-dried for 5 seconds and afterwards sintered in an electric furnace at 600° C. for 2 minutes. The filament lamp was removed from the electric furnace and subject to three minutes of air cooling. The above described actions were repeated. After the second action, cracks formed in the color film. After the third action, part of the color film had been removed. Thus, it was not possible to form a color film.

Action of the Invention

A filament lamp for emission of yellow light is achieved in accordance with the invention in which yellow light can be emitted without using a material which contains heavy metals which have adverse effects on the environment, such as cadmium, lead and the like.

Furthermore, the invention results in a filament lamp for emission of yellow light which has a color film which is easy to produce, with high transparency and high heat resistance and in which yellow light can be emitted without using a material which contains heavy metals which have adverse effects on the environment, such as cadmium, lead and the like.

What we claim is:

1. Filament lamp for an emission of yellow light which comprises:

a glass bulb;

a filament which is located in the bulb; and a color film which is formed on a surface of the bulb;

wherein the color film is essentially composed of a combined oxide of titanium, nickel and antimony;

wherein the color film has a ratio of titanium, nickel and antimony to one another in a weight ratio of 5.6 to 8.6:3.6 to 6.6:1.0 to 1.8.

2. Filament lamp for emitting yellow light as claimed in claim 1, wherein the color film is a sintered coating liquid obtained by admixture of a solution A produced by dissolving a nickel salt and an antimony salt in an organic solvent, addition of a titanium alkoxide and reaction of the reaction mixture; and addition of a stabilizer which forms a chelate with titanium; and a solution B produced in the same manner as solution A, but with water added before the addition of the titanium alkoxide.

3. Filament lamp as claimed in claim 2, wherein the solvent is comprised of at least one component selected from the group consisting of monovalent alcohols, glycol ethers and acetic acid esters.

4. Filament lamp as claimed in claim 2, wherein the stabilizer is in a substantially stoichiometric amount with respect to the titanium.

5. Filament lamp as claimed in claim 2, wherein the stabilizer is selected from the group consisting of a β-keto acid or a β-diketone.

6. Filament lamp as claimed in claim 2, wherein the nickel salt is nickel nitrate.

7. Filament lamp as claimed in claim 2, wherein the antimony salt is antimony trioxide.

8. Filament lamp as claimed in claim 2, wherein the titanium alkoxide is a tetraisopropoxy titanium or tetrabutoxy titanium.

9. Filament lamp as claimed in claim 1, wherein the color film is formed on an outer surface of the bulb.

10. Filament lamp as claimed in claim 9, wherein a second color film is formed on an inner surface of the bulb.

11. Filament lamp as claimed in claim 1, wherein the color film is formed on an inner surface of the bulb.

12. Filament lamp for an emission of yellow light which comprises:

a glass bulb;

a filament which is located in the bulb; and a color film which is formed on a surface of the bulb;

wherein the color film is essentially composed of a combined oxide of titanium, nickel and antimony;

wherein the color film is a sintered coating obtained by admixture of a solution A produced by dissolving a nickel salt and an antimony salt in an organic solvent, addition of a titanium alkoxide and reaction of the reaction mixture; and addition of a stabilizer which forms a chelate with titanium; and a solution B produced in the same manner as solution A, but with water added before the addition of the titanium alkoxide;

wherein the solutions A and B contain nickel nitrate-6-hydrate in an amount of 7 to 13 weight percent, antimony trioxide in an amount of 0.6 to 1.2 weight percent, tetraisopropoxy titanium in an amount of 10 to 15 weight percent and acetyl acetone in an amount of 7 to 12 weight percent; and wherein solution B additionally contains water in an amount of 0.3 to 1.5 weight percent.

13. Filament lamp as claimed in claim 12, wherein the weight proportion of solution A to solution B in the coating liquid is between 90:10 to 30:70.

* * * * *